United States Patent [19]

Galicher

[11] 4,160,497
[45] Jul. 10, 1979

[54] TRANSMISSION ASSEMBLY WITH A BRAKING DEVICE, PARTICULARLY FOR VEHICLES

[75] Inventor: Georges Galicher, Neuilly-sur-Seine, France

[73] Assignee: Etudes et Recherches Avancees, Saint-Etienne, France

[21] Appl. No.: 806,305

[22] Filed: Jun. 13, 1977

[30] Foreign Application Priority Data

Jun. 17, 1976 [FR] France ............................... 76 18405
Jul. 20, 1976 [FR] France ............................... 76 22091

[51] Int. Cl.² ........................ B60K 29/02; F16H 57/10
[52] U.S. Cl. ..................................... 192/4 A; 74/391
[58] Field of Search .................. 192/4 C, 4 A; 74/391

[56] References Cited

U.S. PATENT DOCUMENTS

| 3,132,538 | 5/1964 | Zuppiger | 192/4 A X |
| 4,010,830 | 3/1977 | Logus et al. | 192/4 A |
| 4,037,694 | 7/1977 | Keese | 192/4 A |

FOREIGN PATENT DOCUMENTS 2328929 12/1973 Fed. Rep. of Germany .......... 192/4 A Primary Examiner—Benjamin W. Wyche

[57] ABSTRACT

A transmission assembly with braking device, particularly for vehicles, of the type comprising a speed reduction gear system between a driving shaft and a driven shaft. The braking device is constructed so as to be able to brake, on the one hand, the driving shaft and, on the other hand, the driven shaft. In a preferred embodiment, said driving shaft is coupled to the sun gear and said driven shaft to the planet gear carrier, the reaction ring gear for the planet gears being fixed. Said braking device then comprises a set of braking discs non-rotatably mounted but able to slide on a sleeve itself fixed on the driving shaft, and of which a part, through the action of an appropriate control, can come into frictional contact with the fixed discs integral with the casing, whereas the other part, through the action of said control, can come into frictional contact with the discs integral with said planet gear carrier.

6 Claims, 2 Drawing Figures

TRANSMISSION ASSEMBLY WITH A BRAKING DEVICE, PARTICULARLY FOR VEHICLES

The present invention relates to a transmission assembly with a braking device, particularly for vehicles, of the type having a system of speed reduction gears between a driving shaft and a driven shaft.

The driving shaft can, for example, be one of the two output half-shafts of a conventional differential driving the driving wheels of a vehicle and the driven shaft can be formed by the hub or the stub-shaft of the driving wheel considered.

As for the reduction gear system, it may be in principle of any kind, but preferably of the hypocycloidal type, and its casing carries preferably bearings for the hub or the stub-shaft.

In certain vehicles, particularly heavy vehicles, in which the torque on the driving wheels is high, it is preferable to provide the braking on the driving shaft for the torque is lower there, which permits the use of a disc braking device relatively compact. The cooling thereof is readily achieved by an oil-bath.

However, this arrangement is not always satisfactory from the point of view of braking safety. In fact, if the driving shaft breaks downstream of the point where the braking device acts thereon, the wheel is no longer braked. The same thing happens in the case of breakage of the pinions of the reduction gear system.

The aim of the present invention is to resolve this problem and, to do this, a transmission assembly of the type described at the beginning is characterised in that said braking device is constructed so as to be able to brake, on the one hand, the driving shaft and on the other, the driven shaft.

The driven shaft is then braked, on the one hand indirectly, through the reduction gear system when the driving shaft is braked, i.e. the input shaft of the reduction system, and on the other hand, directly, by concurrent action of the braking device on the driven shaft. In case of breakage of the driving shaft, or of breakage of the pinions of the reduction gear system, consequently, the braking of the driven shaft is always provided.

According to one embodiment of the invention, said braking device is constructed so as to be able to exert a braking force, on the one hand, between said driving shaft and a fixed casing, and, on the other hand, between said driven shaft and said driving shaft.

In other words, the braking of the driven shaft results from the action that the braking device exerts between the driving shaft and the fixed casing and from that which it exerts between the input and the output of the reduction gear system.

Preferably when said speed reduction gear system is of the sun and planet gear type, the driving shaft is coupled to the sun gear and the driven shaft to the planet gear carrier, the reaction ring gear for the planet gears being fixed.

Advantageously, the braking device is housed in a fixed casing integral with the ring gear.

According to a practical embodiment of the invention, said braking device comprises a set of braking discs non-rotatably mounted but able to slide on a sleeve itself fixed on the driving shaft, and a part of which, through the action of an appropriate control, can come into frictional contact with fixed discs integral with said casing, whereas the other part, through the action of said control, can come into contact frictionally with discs integral with the planet gear carrier.

In principle, the dual disc braking device can be located in a fixed casing solid with the casing of the reduction gear system, and the stub-shaft of the wheel, carrying the bearings, can be located at the level of said gear system.

The result, however, would be that the space taken up by the two casings — the casing for the braking device and the casing for the gear system — situated beside each other, would be relatively large. Furthermore, the casing of the driving shaft, in this case the casing for a motor vehicle transmission axle, would be more difficult to construct and the usual standard casing could not be used, because of the large projection forming the casing for the braking device.

According to the invention, to eliminate these disadvantages, the space taken up by the braking device - reduction gear system assembly can be considerably reduced by using a one-piece live axle casing whose ends can serve as stub-shafts, particularly for the wheels of a vehicle.

In accordance with the invention, these extra results are obtained in a transmission assembly of the type mentioned at the beginning, characterised in that the braking device is located in the same casing as that of the reduction gear system, between this latter and the bearings of the driven member.

In other words, relatively to the arrangement mentioned hereabove, the bearings of the driven member, and if necessary the stub-shaft of the wheel, are located on the other side of the braking device, and the presence of this latter, which is moreover housed in the casing of the reduction gear system, and not in a separate casing, will not prevent stub-shafts being formed on the ends of a live axle casing, for example forged in one piece.

The invention can further concern, more precisely, a transmission assembly in which the braking device is constructed so as to be able to exert a braking force, on the one hand, between said driving shaft and a fixed casing and, on the other, between the driven member and said driving shaft, and in which the speed reduction gear system is of the sun and planet gear type, the driving shaft being coupled to the sun gear and the driven member to the planet gear carrier, whereas the reaction ring gear for the planet gears is fixed.

In this case, in accordance with the invention, this assembly can be characterised in that said braking device is located in said ring gear, constituting at one and the same time the said fixed casing and the casing for the gear system.

Preferably, the transmission assembly can, in combination with any one of the preceding arrangements, be characterised in that said braking device comprises a set of braking discs non-rotatably mounted but able to slide on a sleeve itself fixed to the driving shaft, and a part of which, through the action of an appropriate control, can come into frictional contact with fixed discs integral with the casing, whereas the other part, through the action of said control, can come into frictional contact with discs integral with the planet gear carrier.

Two embodiments of the invention are described below and are given as non limiting examples, with reference to the accompanying figures of the drawings in which.

Figure 1:
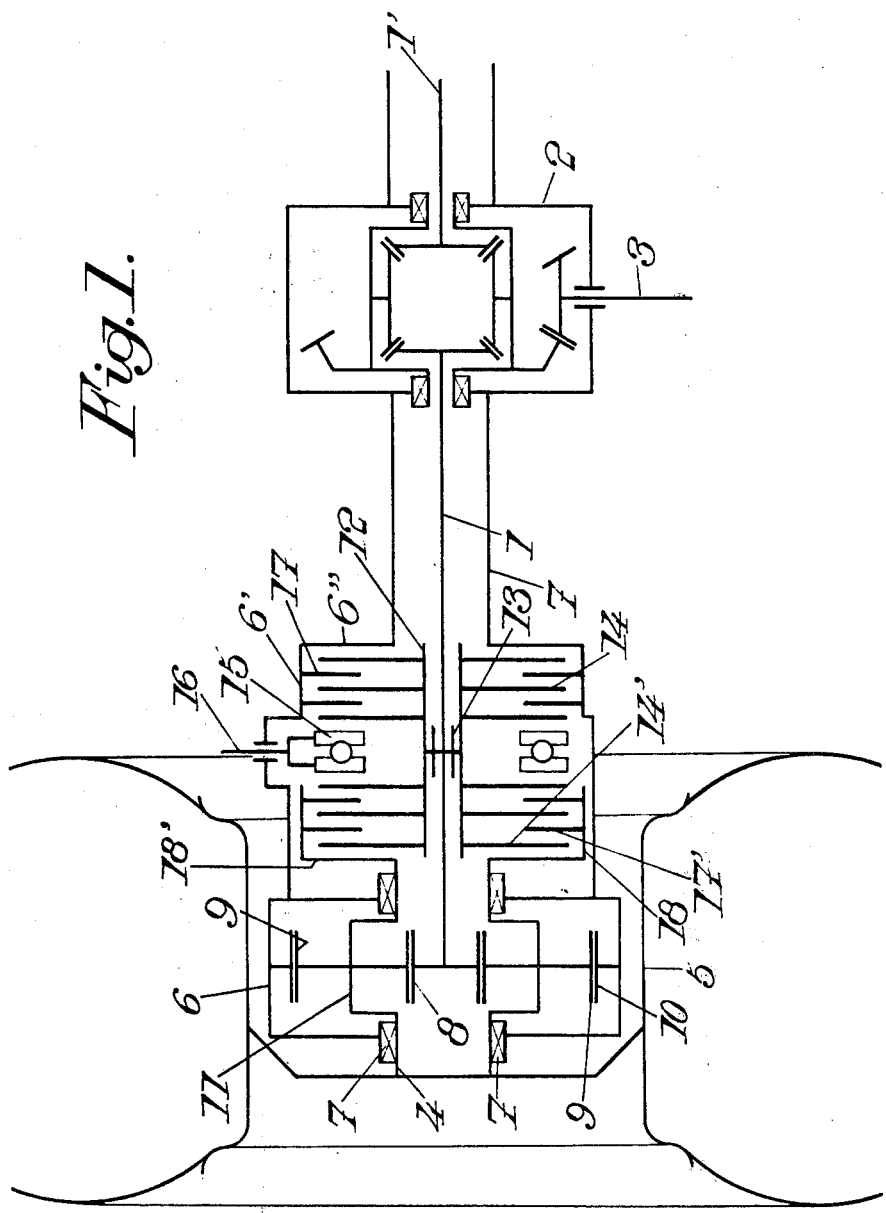
FIG. 1 shows schematically a first embodiment of the invention.

In the mode of application of the invention shown in FIG. 1, it is supposed that driving shaft 1 is formed by one of the two output half-shafts 1, 1' of a differential 2 of a vehicle rear axle, driven by a transmission shaft 3. As for the driven shaft, it will be considered that it is formed by the stub-shaft 4 of a driving wheel 5. The wheel stub-shaft is carried by a fixed casing 6, by means of bearings 7.

The speed reduction gear system between driving shaft 1 and stub-shaft 4 is housed in casing 6 and comprises a sun gear 8 fixed on the end of shaft 1, planet gears such as 9 and an outer ring gear 10 fixed in casing 6. Stub-shaft 4 forms an extension of planet gear carrier 11.

The safety braking device of the invention is housed in an extension 6' of casing 6, i.e. directly in front of the reduction unit in the kinematic chain, and is formed in the following way:

On shaft 1, in casing 6', is fixed a sleeve 12, e.g. by means of splines 13. On this sleeve are braking discs 14, 14' so as to be non-rotatable but slidable axially with respect to the sleeve. Through the action of a conventional ball-ramp mechanism 15 itself actuatable by a pull-handle 16 controlled hydraulically, pneumatically or mechanically, discs 14 can slide on sleeve 12 and provide the braking of driving shaft 1, by coming into frictional contact with discs 17 fixed in casing 6', whose bottom 6" serves as reaction means. At the same time, through the action of said mechanism, discs 14' can slide, in the opposite direction, on sleeve 12, and provide braking of stub-shaft 4, by coming into frictional contact with discs 17' fixed in a bell housing 18 integral with the planet gear carrier 11 and so with stub-shaft 4, the bottom 18' of said bell housing acting as the reaction means. All the discs are in an oil bath.

Thus, when the braking device is actuated, by means of pull-lever 16, a dual braking of stub-shaft 4 is obtained: on the one hand, indirectly through the reduction gear system by braking of shaft 1 and, on the other hand, directly by braking of the planet gear carrier 11.

Thereby, if shaft 1 breaks, e.g. between sleeve 12 and sun gear 8, or if the reduction system can no longer operate because of a pinion breakage, the braking of stub-shaft 4 through planet gear carrier 11, bell housing 18, discs 17'-14', sleeve 12 and discs 14-17, can still be provided, which avoids any risk of accident.

Of course, it will be advisable to calculate the different braking discs with respect particularly to the relative rotational speed of the elements which they are intended to brake: on the one hand, the relative speed of discs 17' in relation to discs 14-14', and on the other hand, the relative speed of discs 14-14' in relation to discs 17.

For example, if the input speed of rotation of the reduction unit (speed of shaft 1) is N and if R is the reduction ratio, the relative rotational speed of discs 17' in relation to discs 14-14' will be:

$$(N/R) - N = (N/R)(1 - R),$$

given that the speed of rotation of the wheel (speed of rotation of discs 17') is N/R.

As for the relative rotational speed of discs 14-14' in relation to discs 17, it will be equal to N, given that discs 17 are fixed.

An actuating mechanism could moreover be provided for the dual control braking device: the first control (normal braking) would only actuate discs 14, so as to put them into contact with discs 17 and brake shaft 1 in a conventional way, and the second control, used only in the case of breakage (emergency braking), would only actuate discs 14' to bring them into contact with discs 17', which would brake shaft 1, and consequently the wheel. Thus would be avoided a permanent operation of the stand-by brake.

Figure 2:
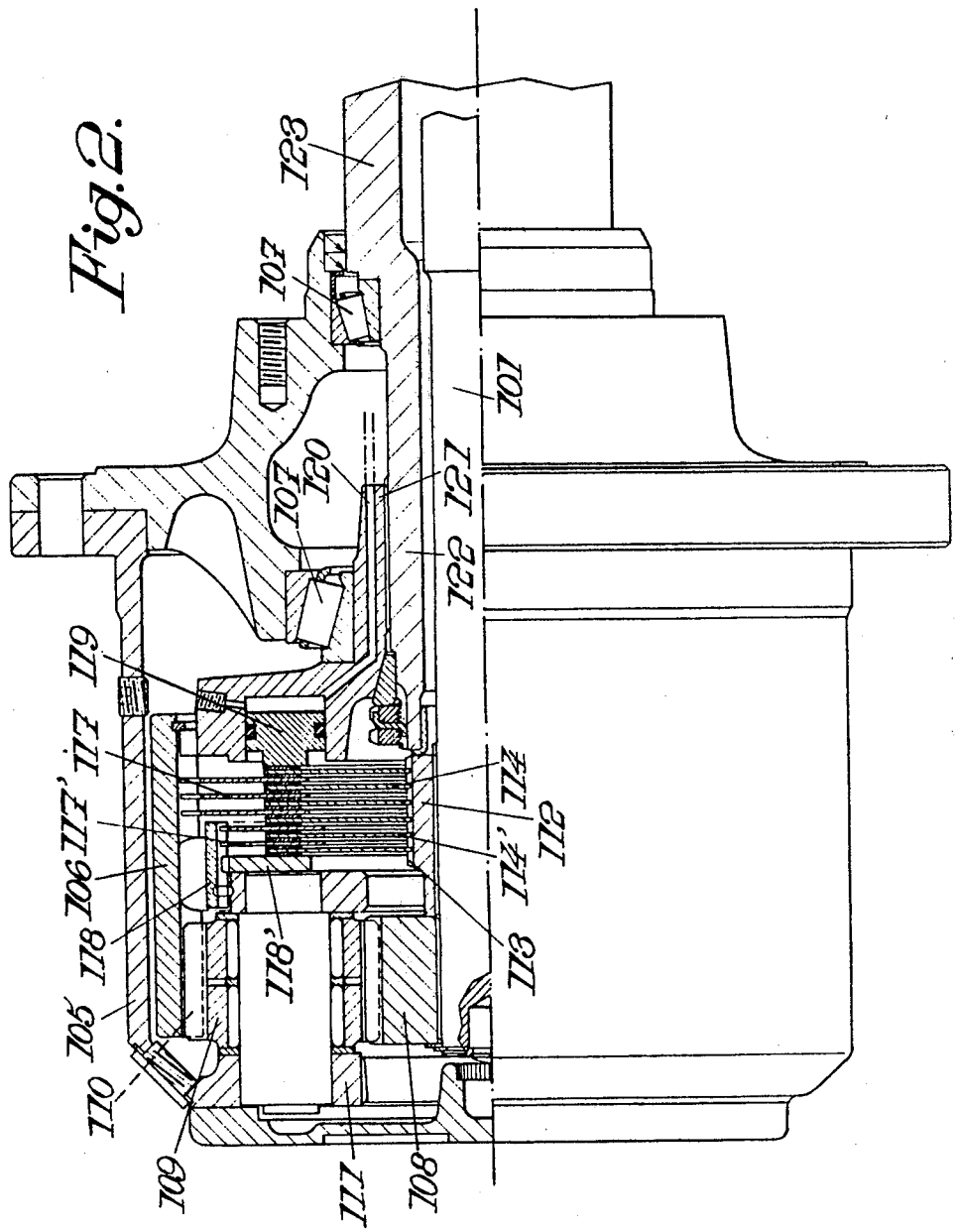
FIG. 2 is an axial half-section of a second embodiment.

In the embodiment of FIG. 2, the speed reduction gear system between the driving half-shaft 101 and the driven member constituted by a wheel 105 comprises a sun gear 108 fixed on the end of the shaft, planet gears 109 and a fixed ring gear 106 with teeth 110, wheel 105 being integral with the planet gear carrier 111. The dual braking device is also constituted essentially in the same manner and comprises discs 114 and 114' fixed on a sleeve 112 by means of splines 113, fixed discs 117 and discs 117' rotatable with the planet gear carrier 111 through a splined ring gear 118. However, the control of the axial movement of the discs is effected by an annular piston 119 whose cylinder is supplied with hydraulic fluid through a pipe 120, so that all the discs can move in the same direction. The reaction means is formed by an annular lining carrier 118' integral with the planet gear carrier 111.

The fundamental difference in relation to the embodiment described and shown as an example in FIG. 1 resides in the fact that the dual disc braking device, instead of being located in an extra casing separated from the casing of the reduction gear system, is located in the same fixed casing 106, i.e. inside the ring gear of the gear system. (It is thus on this casing 106 that are fixed the fixed discs 117). Consequently, a much smaller space is occupied by the assembly.

Furthermore, the braking device is disposed between the reduction system and bearings 107 of the wheel, so that these bearings can be carried by a fixed sleeve 121, integral with the fixed casing 106 and fixed on end 122 of the casing 123 of half-shaft 101. Thus, casing 123 can be forged in one piece, with ends 122 in the form of stub-shafts, which was difficult with the embodiment described for FIG. 1 because of the presence of casing 6' of the braking device. Furthermore, in the case of FIG. 1, the profile of the axle casing was particularly different from the currently used profile.

I claim:

1. A transmission and braking assembly for a vehicle having a driving shaft, a driven member, a speed reduction gear system having a sun gear coupled to said driving shaft, a stationary ring gear and a plurality of planet gears in engagement therewith and mounted in a carrier coupled to said driven member, and a braking device comprising a fixed casing, at least one fixed disc mounted in said casing, and at least one rotatable disc mounted on said carrier, a sleeve keyed to said driving shaft for conjoint rotation therewith, and a plurality of brake discs mounted on said sleeve, said brake discs being mounted so as to be non-rotatable and axially slidable relative to said sleeve, and means for causing said brake discs to slide into engagement engagement with each of said fixed discs and rotatable discs to effect braking of said driving shaft and said driven member.

2. The assembly according to claim 1 wherein said means for causing said brake discs to slide causes engagement of said brake discs with each of said fixed and rotatable discs simultaneously.

3. The assembly according to claim 1 wherein said driving shaft is located within a fixed housing the forward end of said housing being formed as a stub axle on which said driven member is journalled, said braking device being located between the journal and said reduction gear system.

4. The assembly according to claim 3 wherein said casing is integral with said stationary ring gear.

5. The assembly according to claim 1 wherein said speed reduction system is located within the same casing for said braking device.

6. The assembly according to claim 1 where in said braking device is located within said ring gear and said ring gear constitutes a stationary casing for said braking device.

* * * * *